United States Patent [19]
Balde

[11] 3,934,072
[45] Jan. 20, 1976

[54] APPARATUS AND METHOD FOR TERMINATING LINES RUNNING UNDER FLEXIBLE FLOOR COVERING

[75] Inventor: John William Balde, Raritan Township, Hunterdon County, N.J.

[73] Assignee: Western Electric Company, Inc., New York, N.Y.

[22] Filed: Feb. 24, 1975

[21] Appl. No.: 552,679

[52] U.S. Cl.................... 174/48; 29/624; 174/70 R
[51] Int. Cl.².................... H02G 3/08; H02G 3/10
[58] Field of Search............................ 174/48–50, 174/58; 339/119 R, 119 M, 120, 121, 92; 220/3.3, 3.4, 3.5; 29/624

[56] References Cited
UNITED STATES PATENTS

| | | | |
|---|---|---|---|
| 1,839,250 | 1/1932 | Newman et al. | 174/61 |
| 3,083,857 | 4/1963 | Clark | 220/3.94 |
| 3,110,538 | 11/1963 | Rees et al. | 339/121 X |
| 3,334,457 | 8/1967 | Hudson et al. | 52/221 |
| 3,597,523 | 8/1971 | Guritz | 174/48 |

*Primary Examiner*—Darrell L. Clay
*Attorney, Agent, or Firm*—R. Spencer; D. P. Kelley

[57] ABSTRACT

Apparatus and method for terminating flat flexible telephone lines laid flat on the surface of a floor to be covered by flexible floor covering such as carpeting are disclosed, wherein a bracket having a peripheral flange and an opening surrounded on two sides by raised flanges and adapted to receive the telephone lines to be terminated is placed on the floor over the lines and is fastened to the floor. Female telephone connectors are mounted across the raised flanges over the opening, and the telephone lines are brought up through the opening and are connected thereto. A shallow temporary cover is mounted on the bracket to cover the opening, the telephone lines extending therethrough and the female telephone connectors but not the peripheral flange. The flexible floor covering is laid over the floor, the lines and the covered bracket. Thereafter, the floor covering is slit to expose the covered bracket, the temporary cover protecting the lines extending through the opening in the bracket and the telephone connectors, and the peripheral flange protecting the lines running to the bracket, against the slitting knife. When the installation is to be completed, the temporary cover is removed. Male telephone connector plugs with lines attached thereto are inserted in the telephone connectors and a housing is now fastened to the bracket to complete the installation.

5 Claims, 5 Drawing Figures

APPARATUS AND METHOD FOR TERMINATING LINES RUNNING UNDER FLEXIBLE FLOOR COVERING

BACKGROUND OF THE INVENTION

1. Field of the Invention

This invention relates, broadly speaking, to apparatus and method for terminating lines running under flexible floor covering. More specifically, this invention relates to apparatus and method for terminating flat flexible telephone lines running along a floor under carpeting or the like.

2. Description of the Prior Art

Apparatus, and methods for installing the same, to terminate lines running under flexible floor covering are known.

It is not known, however, how to efficiently install equipment to terminate flat flexible lines prior to laying the flexible floor covering and thereafter protecting such termination equipment while actually laying the flexible floor covering, and protecting the lines running underneath the termination equipment while cutting the floor covering to expose the termination equipment to complete the installation.

The present invention solves the foregoing problems.

SUMMARY OF THE INVENTION

The present invention, in a preferred embodiment of apparatus which is only one aspect thereof, comprises a bracket formed of a plate having a peripheral flange, an opening to receive from below the plate a line to be terminated, and raised flanges extending from two opposite sides of the opening partially over the opening, to which raised flanges a line connector is secured and to which line connector the line to be terminated is connected.

The present invention, in a method of using the preferred embodiment of apparatus, comprises securing to a floor the bracket over the line to be terminated, extending the line up through the opening in the bracket plate and connecting the line to a line connector mounted across the raised flanges of the bracket, covering the bracket with a shallow temporary cover to conceal the opening in the bracket plate and line connector while leaving exposed the peripheral flange, laying flexible floor covering over the floor, the line and the covered bracket, slitting the floor covering to expose the covered bracket, removing the temporary cover from the bracket, and then mounting a housing to the bracket.

BRIEF DESCRIPTION OF THE DRAWINGS

Referring now to the drawings in which like numerals represent like parts in the several views.

DESCRIPTION OF THE PREFERRED EMBODIMENT

Figure 1:
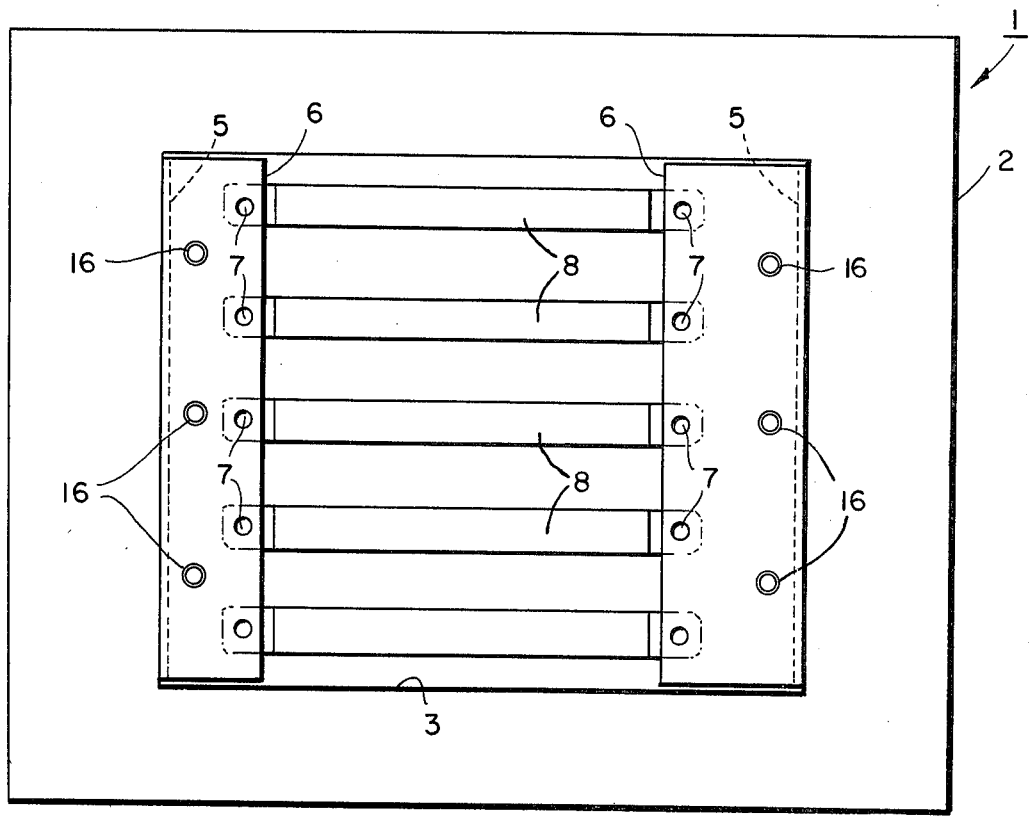
FIG. 1 represents a view in plan of a bracket constructed according to the present invention and adapted to provide a termination for one or more telephone lines, showing the telephone connectors mounted across the raised flanges of the bracket.

In one aspect of the preferred embodiment, bracket 1 is seen as being provided with an outwardly extending peripheral flange 2 running around the entire perimeter of the bracket 1.

An opening 3 is provided in bracket 1, for the reception of flat flexible telephone lines 4. On two opposite sides of the opening 3, vertical legs 5 extend upwardly, and flanges 6 at the tops of legs 5 project toward each other over the opening 3. Advantageously, and particularly where bracket 1 is formed from sheet metal material, legs 5 and flanges 6 may be formed integrally with the said bracket 1, being bent according to recognized sheet metal shop practice. Alternatively, bracket 1 may be made by well-known casting or molding techniques, particularly when formed of polymeric materials, in which event the mold will include provision for the legs 5 and flanges 6. As yet another alternative, the legs 5 and flanges 6 may be formed separately and apart from bracket 1, and then secured to the said bracket 1 by means of a suitable cement, by welding, by fasteners such as screws or rivets, or by any other suitable means or techniques known to those familiar with the art.

Flanges 6 are provided with a plurality of apertures 7 arranged in opposed pairs as shown in FIG. 1. Female telephone connectors 8 are mounted to flanges 6, by means of suitable fasteners such as screws extending through aperture 7, and terminate telephone lines 4 extending upwardly from under carpeting or the like through opening 3. Each female telephone connector 8 is adapted to receive, in the known manner, a male telephone connector plug 9 having a telephone cord 10 leading to various items of telephone equipment (not shown) as required. The female telephone connectors 8 may be mounted across the flanges 6 in upwardly facing position, as shown, or under some circumstances it may be preferred to mount the said female telephone connectors 8 under the flanges 6 and facing sideways.

Housing 14 is fastened to the bracket 1 to complete the installation, by fastening means such as screws which are extended through apertures in the housing 14 and which are threaded into threaded sockets 15 mounted to flanges 6 beneath apertures 16 therein.

Bracket 1 is intended for use primarily with telephone lines of the flat flexible type known in the art, such flat flexible lines being readily concealed beneath carpeting.

The use of bracket 1 in terminating undercarpet telephone lines, preferably of the flat flexible type, will now be described.

It will be assumed that flat flexible telephone lines 4 have been run over a floor 18 in accordance with a predetermined layout or plan so that such lines extend to stations in the immediate vicinity of those desks and other office furniture and fixtures which are to be provided with telephone service. At each such station, a bracket 1 is positioned overlying the telephone lines (i.e., peripheral flange 2 lies on the telephone lines), and the bracket 1 is then secured by convenient and suitable means to the floor 18. Securement of the bracket 1 to the floor may be effected by taping the peripheral flange 2 to the floor, or by employing an adhesive (such as a pressure-sensitive adhesive on the bottom of the bracket 1), or by bolting the bracket 1 to the floor. If bracket 1 is to be bolted to the floor, holes (not shown) may be drilled at convenient locations along peripheral flange 2, and bolts (not shown) may be inserted through said holes into the floor. Thereafter, the ends of the telephone lines to be terminated at the station are brought up through opening 3. At this point, the female telephone connectors 8 may be mounted across flanges 6 and the telephone lines 4 connected thereto.

Figure 2:
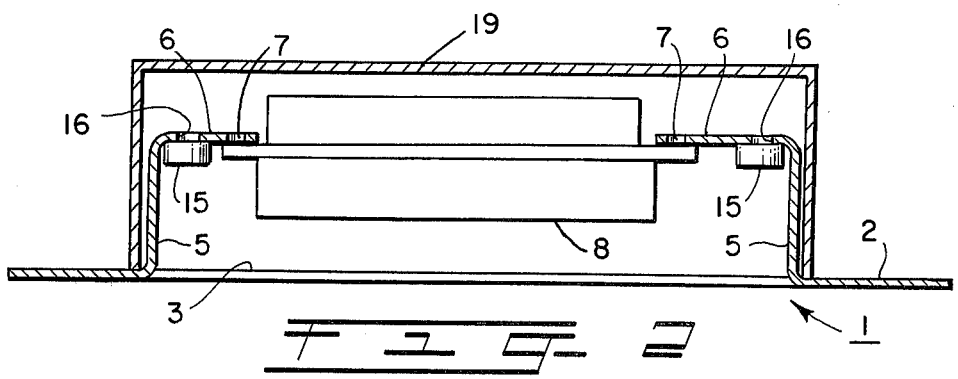
FIG. 2 represents a section of the bracket of FIG. 1, showing a telephone connector and a temporary protective cover in section.
Figure 3:
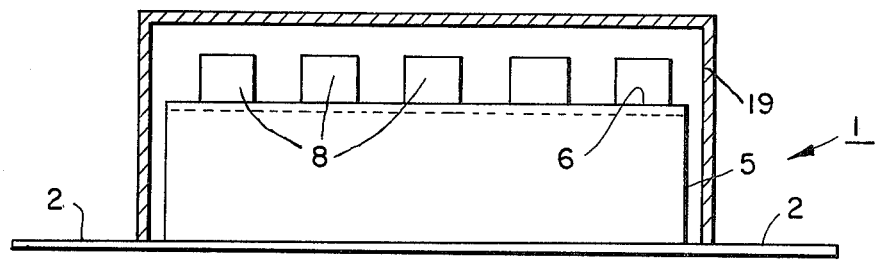
FIG. 3 represents a view in end elevation of the bracket of FIG. 1 showing the telephone connectors, as well as the temporary protective cover.
Figure 4:
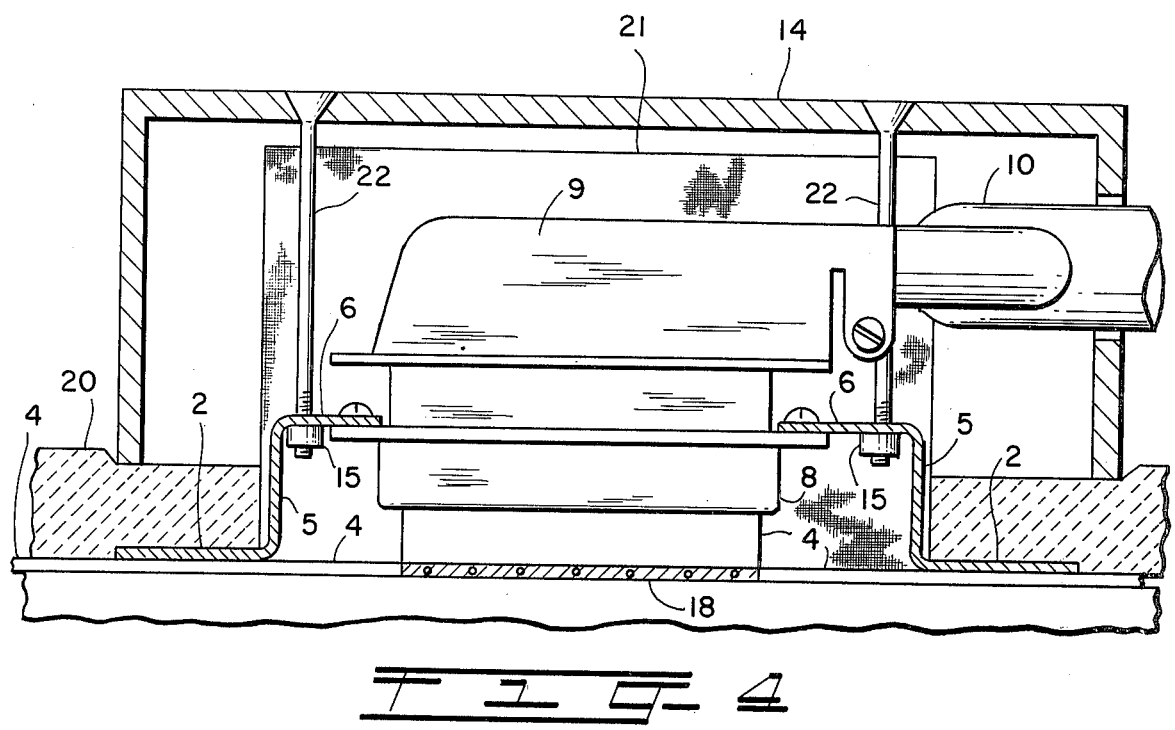
FIG. 4 represents a view in side elevation of the bracket of FIG. 1, showing the same positioned for use in a carpeted location and showing further in medial longitudinal section the housing mounted thereon.

A shallow temporary protective cover 19 is now secured to bracket 1 by suitable means. Temporary cover 19 is large enough to extend over and conceal opening 3, but does not extend appreciably over peripheral flange 2, as shown in FIGS. 2 and 3.

Thereafter, carpeting 20 is laid over the floor, telephone lines 4, and bracket 1 with the temporary cover 19 mounted thereon.

It will be apparent that the flat flexible telephone lines, having a very low thickness as is known in the art, will not be likely to cause any such disturbances in the surface of the carpeting 20 as would reveal their presence. It will also be apparent that bracket 1 with temporary cover 19 mounted thereon exhibits a relatively low profile which will not disturb the laying of the said carpeting 20 as might otherwise occur if the carpeting 20 is laid over a relatively high object.

The installer will now manually locate the bracket 1 through the carpeting 20 and will slit the carpeting 20 approximately along the center of, and lengthwise of, the temporary cover 19, the slitting knife passing through the carpeting 20 and riding along the top surface of the temporary cover 19. Thereafter, the installer will slit the carpeting 20 along the short sides of the temporary cover 19, the slitting knife passing through the carpeting 20 close to the sides of the temporary cover 19 and riding along the top surfaces of the flanges 6. It is important to note that, in addition to protecting bracket 1 and female telephone connectors 8 from the heavy carpet roll when the carpeting 20 is first being laid over the floor 18, the temporary cover 19 protects said female telephone connectors 8 and associated telephone lines extending through opening 3 from damage by the installer's knife. It is also important to note that the flange 2 protects the underlying telephone lines from the installer's knife.

The slits in the carpeting 20, made as hereinbefore described, are straight and the carpeting is not mutilated. The slitting operation results in two flaps 21 of carpet material which can be folded upwardly to expose the bracket 1 and temporary cover 19.

Figure 5:
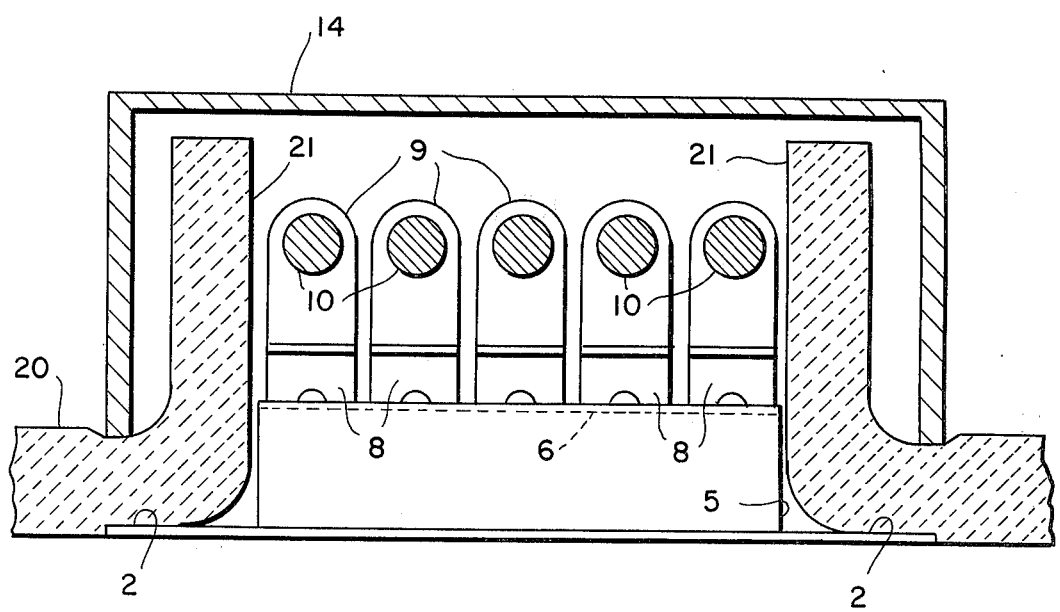
FIG. 5 represents a view in end elevation of the bracket of FIG. 1, showing the same positioned for use in a carpeted location and showing in medial longitudinal section the housing mounted thereon.

Thereafter, temporary cover 19 is removed from bracket 1 and male telephone connector plugs 9 having telephone cords 10 attached thereto may now be inserted in their respective female telephone connectors 8. Housing 14 is now fastened to the bracket 1 as hereinbefore described, by means of screws 22 threaded into sockets 15, and flaps 21 are made to extend upwardly within the housing 14, as best shown in FIG. 5, thereby completing the installation.

It will be noted that no pieces of the carpeting 20 had been cut out and removed from the said carpeting 20 in making the installation, and that the flaps 21 are preserved in and protected by the housing 14. If subsequent relocation and rearrangement of office furniture should require removal of any of the installations, then, after removal of bracket 1 from the floor, the flaps 21 can be relaid in the known manner on the floor and there will not be any readily visible evidence of the carpeting 20 ever having been open in the area of the original installation.

It will be clearly understood that, in the specification and drawings, a preferred embodiment representing only one aspect of the invention has been described, and that the article herein disclosed and its method of use may be modified without departing from the spirit and scope of the invention.

What is claimed is:

1. Apparatus terminating a line running along a floor underneath a flexible floor covering said apparatus comprising:
    a. a plate having a peripheral flange extending around the perimeter thereof, said peripheral flange extending underneath said floor covering and over said line, said plate having an opening extending therethrough and adapted to receive from below the plate the line to be terminated, said opening having a first edge and an opposed second edge;
    b. a first upstanding leg on said plate adjacent the first edge of said opening, said first leg being located inwardly of said peripheral flange;
    c. a first flange on the upper end of said first leg extending partially over said opening toward the second edge thereof;
    d. a second leg on said plate adjacent the second edge of said opening, said second leg being located inwardly of said peripheral flange;
    e. a second flange on the upper end of said second leg extending partially over said opening toward the first edge thereof;
    f. said first and second legs extending through an opening in said floor covering;
    g. a connector mounted between said first and second flanges and connected to said line;
    h. cover means mounted to said plate and concealing said opening and said first and second legs and said first and second flanges.

2. Apparatus as in claim 1, wherein:
    i. said first and second flanges lie in a common plane parallel to the plane of said plate.

3. Method for terminating at a station on a floor a line running along the floor which is to be concealed by flexible floor covering, said method comprising:
    a. placing a bracket having a peripheral flange and an opening adapted to receive the line to be terminated on the floor at said station with the opening over the line to be terminated and then securing the bracket to the floor;
    b. bringing the line to be terminated up through the opening in the bracket and connecting the line to a terminating connector on the bracket;
    c. mounting a shallow temporary cover on the bracket over the opening and terminating connector, leaving the peripheral flange exposed;
    d. laying the flexible floor covering over the floor, the line running on the floor, and the bracket;
    e. slitting the flexible floor covering over the temporary cover and along the peripheral flange of the bracket;
    f. removing from over the temporary cover the slit floor covering thereby to expose the temporary cover;

g. removing the temporary cover from the bracket;
h. mounting a housing on the bracket to cover the said bracket.

4. Method as in claim 3, wherein the terminating connector is female and wherein subsequent to step (g), a male connector plug having a line attached thereto is inserted into the terminating connector.

5. Method as in claim 3, wherein:
i. step (e) is performed by making a first slit through the floor covering approximately along the center of the temporary cover, and by making two slits through the floor covering at right angles to the first slit along two opposite sides of the temporary cover forming two flaps in the floor covering;
j. step (f) is performed by peeling away to a vertical position the two flaps of floor covering from over the temporary cover;
k. in performing step (h), the two flaps are retained within the housing.

* * * * *